United States Patent
Kuester et al.

(10) Patent No.: US 9,718,409 B2
(45) Date of Patent: Aug. 1, 2017

(54) FULL DISPLAY MIRROR WITH WORM GEAR DRIVEN TOGGLE MECHANISM

(71) Applicant: Gentex Corporation, Zeeland, MI (US)

(72) Inventors: Ulrich A. Kuester, Spring Lake, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/053,290

(22) Filed: Feb. 25, 2016

(65) Prior Publication Data
US 2016/0250974 A1    Sep. 1, 2016

Related U.S. Application Data

(60) Provisional application No. 62/121,983, filed on Feb. 27, 2015.

(51) Int. Cl.
*H04N 7/18* (2006.01)
*B60R 1/12* (2006.01)
(Continued)

(52) U.S. Cl.
CPC .................. *B60R 1/12* (2013.01); *B60R 1/04* (2013.01); *F16H 19/08* (2013.01);
(Continued)

(58) Field of Classification Search
CPC ..... B60R 1/04; B60R 1/12; B60R 2300/8026; B60R 2001/1253; B60R 2001/1215;
(Continued)

(56) References Cited

U.S. PATENT DOCUMENTS 3,421,728 A    1/1969    Gordon
4,895,337 A    1/1990    Oskam et al.
(Continued)

OTHER PUBLICATIONS

International Search Report and Written Opinion of the International Searching Authority, or the Declaration dated May 12, 2016 for International Application No. PCT/US2016/018956, filed on Feb. 22, 2016, 8 pages.

*Primary Examiner* — Joseph Ustaris
*Assistant Examiner* — Jill Sechser
(74) *Attorney, Agent, or Firm* — Price Heneveld LLP; Bradley D. Johnson (57) ABSTRACT

A rearview mirror for a vehicle includes a housing defining an interior cavity and an open side, a substrate coupled within the open side of the housing and having a reflective surface thereon, and an actuation mechanism coupled within the housing. The actuation mechanism has a mounting plate rotatably coupled within the cavity of the housing at a first end thereof, a spring plate coupled with the mounting plate and having a resiliently deformable spring arm extending away from the mounting plate, and a socket body rotatably coupled within the interior cavity of the housing, the spring arm of the spring plate being operably coupled with the socket body at a coupling axis therebetween. A motor is coupled within the interior cavity of the housing and is operably coupled with the socket body to drive rotation thereof by a reduction mechanism including a worm gear.

20 Claims, 4 Drawing Sheets

(51) Int. Cl.
*B60R 1/04* (2006.01)
*F16H 19/08* (2006.01)
*G02B 27/01* (2006.01)

(52) U.S. Cl.
CPC ..... *G02B 27/0101* (2013.01); *G02B 27/0149* (2013.01); *B60R 2001/1215* (2013.01); *B60R 2001/1253* (2013.01); *B60R 2300/205* (2013.01); *B60R 2300/8026* (2013.01); *H04N 7/183* (2013.01)

(58) Field of Classification Search
CPC .......... B60R 2300/205; G02B 27/0101; G02B 27/0149; F16H 19/08; H04N 7/183
USPC ........................................................ 348/148
See application file for complete search history.

(56) References Cited

U.S. PATENT DOCUMENTS

| | | | |
|---|---|---|---|
| 7,255,451 B2 * | 8/2007 | McCabe | B60R 1/088 359/265 |
| 7,722,199 B2 | 5/2010 | DeWard et al. | |
| 2005/0068647 A1 | 3/2005 | Brandt | |
| 2005/0248847 A1 * | 11/2005 | Weimer | B60R 1/087 359/604 |
| 2008/0049344 A1 * | 2/2008 | DeWard | B60R 1/04 359/877 |

* cited by examiner

FULL DISPLAY MIRROR WITH WORM GEAR DRIVEN TOGGLE MECHANISM

CROSS REFERENCE TO RELATED APPLICATION

This application claims priority under 35 U.S.C. §119(e) to U.S. Provisional Patent Application No. 62/121,983, filed on Feb. 27, 2015, entitled "FULL DISPLAY MIRROR WITH WORM GEAR DRIVEN TOGGLE MECHANISM," the disclosure of which is hereby incorporated herein by reference in its entirety.

TECHNOLOGICAL FIELD

The present disclosure relates generally to a full-display rearview mirror for a motor vehicle and, more particularly, relates to a mechanism for automatic movement of the display mirror substrate between active and inactive positions.

BACKGROUND

Automotive rearview mirrors including video displays therein may be referred to as full-display mirrors. Such mirrors may also include functionality as an ordinary, reflective rearview mirror that can be implemented as an alternative to the included video display, which can be done, for example, in response to a loss of power to the video display or the like. Incorporation of such functionality has been accomplished by including a reflective surface over the video display that is at least partially transparent such that the display is visible therethrough. To prevent the reflected image from interfering with the video image, when available, the mirror may be tilted upward, toward the vehicle headliner, such that the reflective image is less noticeable to the driver and. Such tilting has been implemented, for example, by use of a bi-modal lever that the driver can use to manually move the mirror between the upwardly-tilted position associated with video display use and a position whereby the reflective surface can be used in connection with the rearview mirror. Such mechanisms require manual input by the user and may give an undesirable appearance of an ordinary prism-mirror. Accordingly, further advances may be desired.

SUMMARY

According to one aspect of the present disclosure, a rearview mirror for a vehicle includes a housing defining an interior cavity and an open side, a substrate coupled within the open side of the housing and having a reflective surface thereon, and an actuation mechanism coupled within the housing. The actuation mechanism has a mounting plate rotatably coupled within the cavity of the housing at a first end thereof, a spring plate coupled with the mounting plate and having a resiliently deformable spring arm extending away from the mounting plate, and a socket body rotatably coupled within the interior cavity of the housing, the spring arm of the spring plate being operably coupled with the socket body at a coupling axis therebetween. A motor is coupled within the interior cavity of the housing and is operably coupled with the socket body to drive rotation thereof by a reduction mechanism including a worm gear.

According to another aspect of the present disclosure, a rear-vision system for a vehicle includes a video camera mounted on the vehicle in a position to capture an image of a portion of an exterior thereof and a display mirror. The display mirror includes a housing defining an interior cavity and an open side, a substrate coupled within the open side of the housing and having a reflective surface thereon, and an actuation mechanism coupled within the housing. The actuation mechanism has a mounting plate rotatably coupled within the cavity of the housing at a first end thereof, a spring plate coupled with the mounting plate and having a resiliently deformable spring arm extending away from the mounting plate, and a socket body rotatably coupled within the interior cavity of the housing, the spring arm of the spring plate being operably coupled with the socket body at a coupling axis therebetween. A motor is coupled within the interior cavity of the housing and is operably coupled with the socket body to drive rotation thereof by a reduction mechanism including a worm gear.

According to another aspect of the present disclosure, a vehicle includes a windshield, a headliner adjacent an upper edge of the windshield, and a mirror assembly. The mirror assembly has a substrate including a display and a one-way reflective layer overlying the display, a mounting plate rotatably coupled within the cavity of the housing at a first end thereof, a spring plate coupled with the mounting plate and having a resiliently deformable spring arm extending away from the mounting plate, and a socket body rotatably coupled within the interior cavity of the housing, the spring arm of the spring plate being operably coupled with the socket body at a coupling axis therebetween. A motor is coupled within the interior cavity of the housing and is operably coupled with the socket body to drive rotation thereof by a reduction mechanism including a worm gear.

These and other features, advantages, and objects of the present device will be further understood and appreciated by those skilled in the art upon studying the following specification, claims, and appended drawings.

DETAILED DESCRIPTION OF EMBODIMENTS

Figure 1:
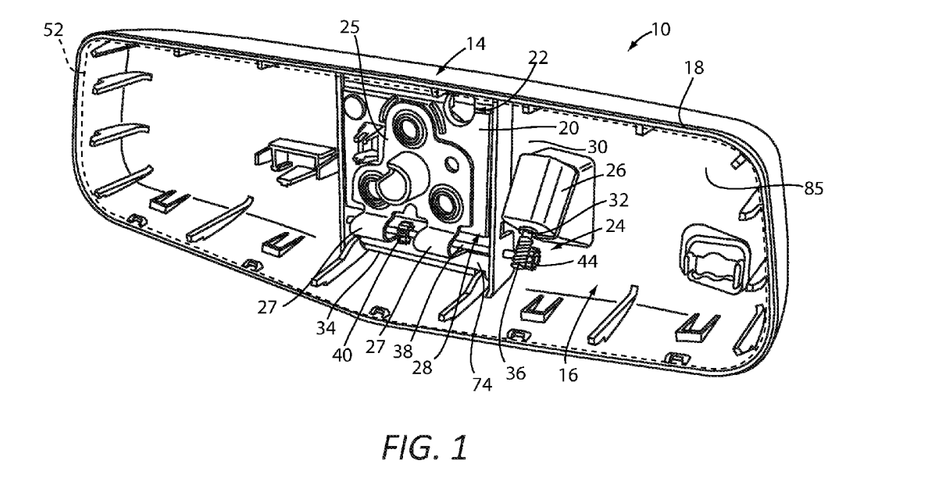
FIG. 1 is a front perspective view of a portion of a rearview mirror according to an aspect of the disclosure and including an actuation mechanism for tilting a display substrate included therewith.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
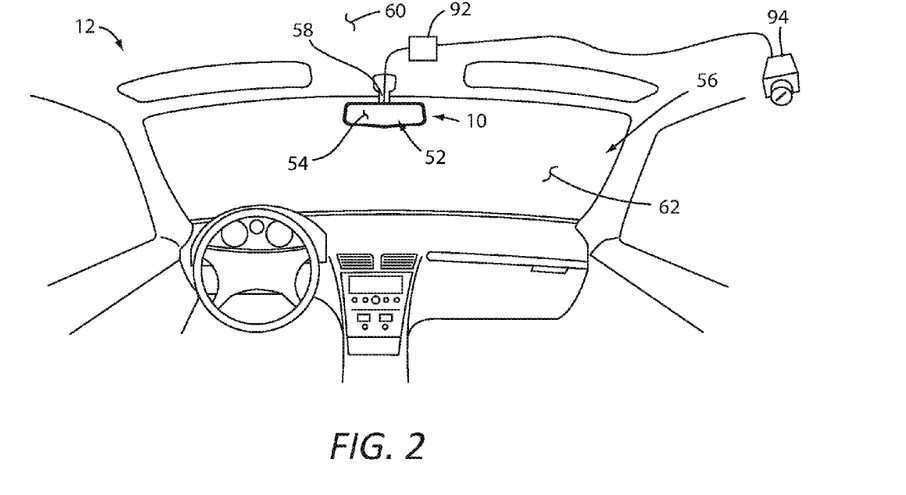
FIG. 2 is a perspective view of a portion of a vehicle interior including the rearview mirror of FIG. 1.

Referring now to FIG. 1, reference numeral 10 generally designates a rearview mirror for a vehicle 12 (of which the interior thereof is shown in FIG. 2). Rearview mirror 10 includes a housing 14 defining an interior cavity 16 and an open side 18 to the cavity 16. The rearview mirror 10 further includes an actuation mechanism 24 within the housing 14 and having a mounting plate 20 rotatably coupled within the cavity 16 of the housing 14 at a first end 22 of the mounting plate 20. The actuation mechanism 24 further has a spring plate 25 coupled with the mounting plate 20 and with a resiliently deformable spring arm 27 extending therefrom. A socket body 34 is rotatably coupled within the interior cavity 16 of the housing 14, the spring arm 27 of the spring plate 25 being operably coupled with the socket body 34. A motor 26 is coupled within the interior cavity 16 of the housing 14 and is operably coupled with the socket body 34 by a worm gear 36 to drive rotation thereof.

As shown in the Figures, motor 26 is operable to drive movement of mounting plate 20 relative to housing 14, with which motor 26 is rigidly coupled (such as by attachment thereof with wall 30, for example) by rotation of socket body 34 between opposing, stable positions provided by spring plate 25 (and in particular spring arms 27) in the operable engagement thereof with socket body 34. To overcome the force of spring arms 27 that provides the stable positions of socket body 34 and, accordingly, of mounting plate 20, motor 26 may connect with socket body 34 by worm gear 36, which is coupled between an output shaft 32 of motor 26 and a bearing shaft 38 that is operably coupled with socket body 34.

As shown in FIG. 2, rearview mirror 10 can be used in connection with a vehicle interior 56. In one embodiment substrate 52 can include a video display along a portion or an entirety thereof such that rearview mirror is what may be referred to as a full-display mirror. A substrate 52 including such a display is referred to herein as "display substrate 52" and may be capable of displaying an image replicating that which would be available from a typical reflective mirror (which may be captured by an appropriately-positioned video camera, such as camera 94, or the like) when the display is in an active state. Such an image can be supplemented with other information presented on display substrate 52. In combination with such a display substrate 52, reflective surface 54 may be applied so as to overlie the display as a coating or separate element having properties to both provide a reflected image as well as to permit a video image of display substrate 52 to be visible therethrough in what may be referred to as a rear vision system.

The presence of reflective surface 54 permits substrate 52 to be used as a standard rearview mirror (i.e. without the need to view the displayed image) when the display is inactive, which may occur when the related vehicle 12 is not running or when power to the display substrate 52 is interrupted, for example. When in the active state, however, the presence of the reflective surface 54 over display substrate 52 can cause the image reflected by reflective surface 54 to compete with an image presented on display substrate 52. To alleviate such image competition, substrate 52 can be positioned such that reflective surface 54 reflects an image of the headliner 60 toward the driver. Because vehicle headliners are of generally consistent, non-reflective material, such an image may compete less with the video image of display substrate 52.

Figure 3:
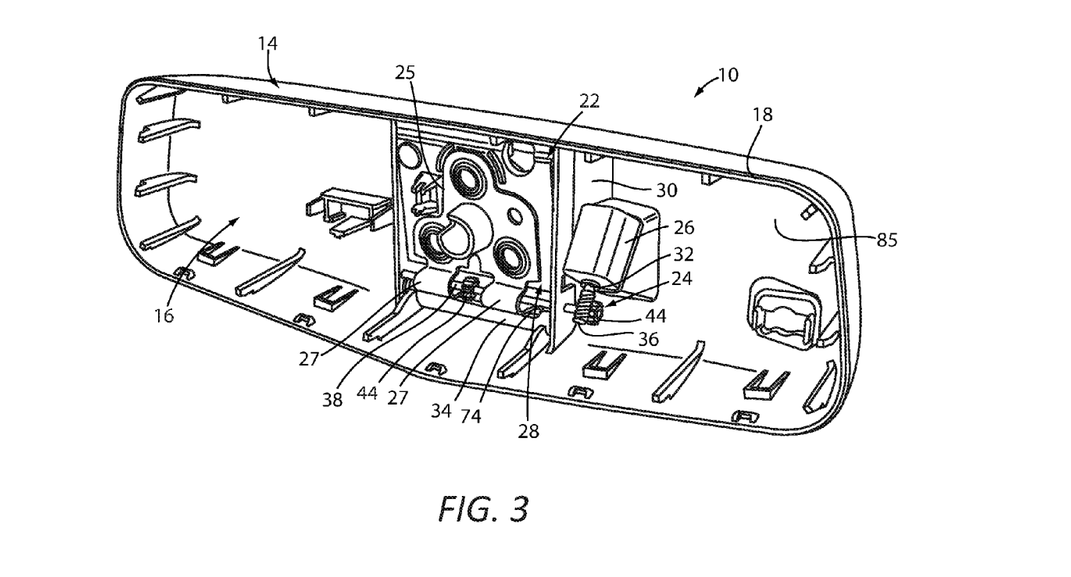
FIG. 3 is a front perspective view of the rearview mirror portion of FIG. 1 with the actuation mechanism in an additional configuration provided thereby.

Rearview mirror 10, by way of the actuation mechanism 24, including mounting plate 20, spring plate 25, socket 34, motor 26, and worm gear 36 can provide for automatic repositioning of the remainder of mirror 10 (i.e., housing 14 and display substrate 52) between an appropriate position thereof for use of reflective surface 54 when display substrate 52 is in the inactive state (as shown in FIG. 1) and for viewing of a displayed image, without undesirable competition, when display substrate 52 is in the active state (as shown in FIG. 3). Such a mechanism can also obviate any need for a lever or other form of mechanical, manually operable feature, which may provide a more "high-end" or aesthetically pleasant form for rearview mirror 10.

To facilitate such movement, the above-described internal components of rearview mirror 10, including spring plate 25, socket body 34, motor 26, and worm gear 36 can move housing 14 by the above-described rotation of mounting plate 20 about first end 22 thereof. Mounting plate 20 can couple directly with mounting structure 58, or with an intermediate element (not shown), used to mount rearview mirror 10 within vehicle 12. Housing 14 may have an aperture (not shown) adjacent mounting plate 20 such that mounting structure 58 can pass therethrough, thus allowing mounting plate 20 to couple with mounting structure 58 to retain rearview mirror 10 in an adjustable position with respect to windshield 62 or headliner 60. Accordingly, the above-described relative movement of mounting plate 20 with respect to housing 14 causes movement of housing 14 (and accordingly substrate 52 coupled therewith) in the form of rotation thereof about first end 22 of mounting plate 20. Such movement, in turn moves substrate 52 between the above-described active (FIG. 3) and inactive (FIG. 1) positions, according to whether or not display substrate 52 is in an off-state or an on-state.

As shown in FIG. 1, when display substrate 52 is inactive, rearview mirror 10 can be configured with actuation mechanism 24 and mounting plate 20 in the corresponding inactive position such that display substrate 52 can be manually moved to an appropriate position for use of reflective surface 54. Such movement can be done by the driver of vehicle 12 by movement of housing 14 about mounting structure 58, in a manner similar to that which is used for conventional rearview mirrors. Upon activation of the display substrate 52, rearview mirror 10, as described further below, can cause housing 14 and display substrate 52 to tilt upward with respect to housing 14, thereby orienting reflective surface 54 toward headliner 60, as shown in FIG. 3. Such orientation can be achieved by rotation of mounting plate 20 with respect to housing 14 through an angle of about 6°, although such an angle can vary based on the location and structure of rearview mirror 10. Upon deactivation of display substrate 52, rearview mirror 10 can return display substrate 52 to the orientation shown in FIG. 1.

Figure 4:
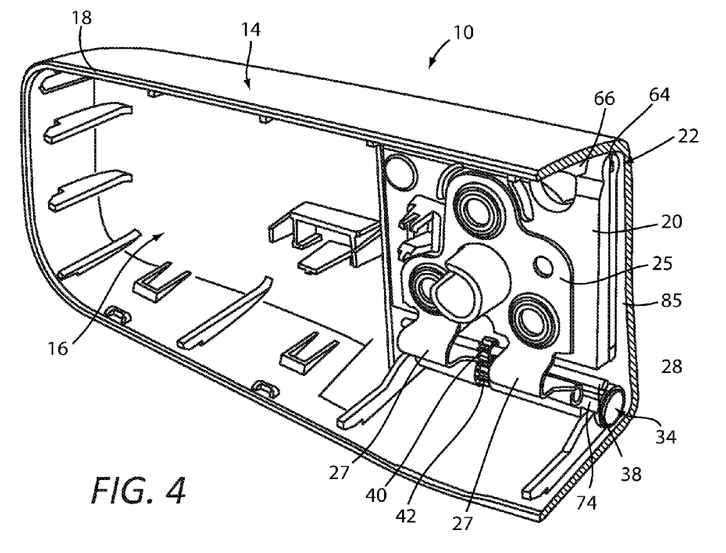
FIG. 4 is a front perspective cross-section view of a portion of the rearview mirror of FIG. 1 with the actuation mechanism in a configuration corresponding to an inactive position of the rearview mirror.
Figure 5:
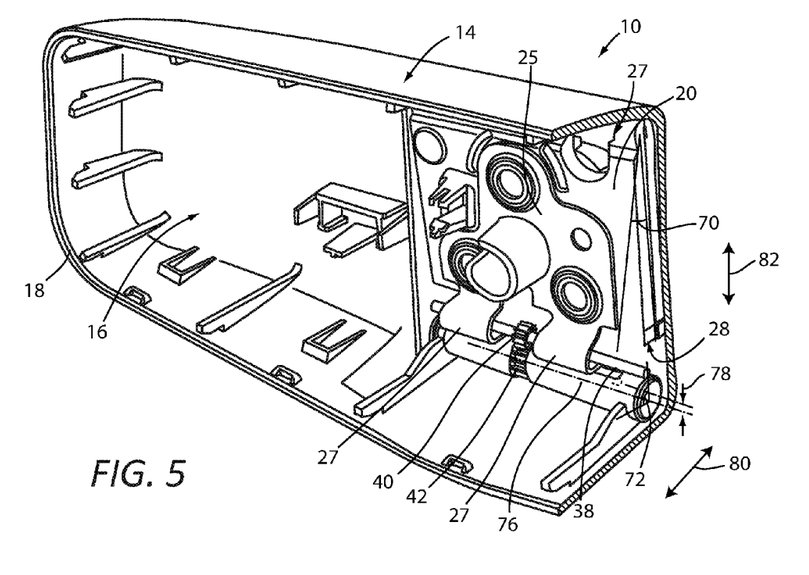
FIG. 5 is a front-perspective cross-section view of a portion of the rearview mirror of FIG. 1 with the actuation mechanism in a configuration corresponding to an active position of the rearview mirror.

The movement of display substrate 52 (i.e. by overall movement of rearview mirror 10) can be achieved by rotation of socket body 34 to move mounting plate 20 with respect to housing 14 by the coupling of spring plate 25 between socket body 34 and mounting plate 20. Rotation of socket body 34 can be achieved by rotation of bearing shaft 38, which itself is operably coupled with socket body 34 by a mesh engagement between gear 40 and teeth 42 (which can be present on socket body 34, as shown in FIGS. 4 and 5, such as by integral formation therewith, and can align with gear 40 so as to encircle a portion of socket body 34 outside of slot 74, teeth 42 being shown in FIGS. 4 and 5 in an exaggerated manner extending over slot 74, and not shown in the remaining figures for clarity), gear 40 being coupled with bearing shaft 38 and teeth 42 being coupled with (such as by being integrally formed on) socket body 34. Rotation of bearing shaft 38 is driven by motor 26 by a mesh engagement between worm gear 36, which is coupled with output shaft 32 of motor 26, and worm wheel 44, which is coupled with bearing shaft 38.

In an embodiment, rotation of output shaft 32 by motor 26 can be implemented automatically upon a change in the state (from active to inactive or vice versa) of display substrate 52 to move mirror 10 from one position to the other (e.g., from active to inactive or vice versa) as needed. In an example, motor 26 can be automatically used to turn worm gear 36 to cause movement of housing 14 and display substrate 52 from the inactive state (shown in FIG. 1) to the active state (shown in FIG. 3) upon a detected malfunction of display substrate 52 or powering down of vehicle 12. By the use of socket body 34 and spring plate 25 to move mounting plate 20 to achieve such positioning of substrate 52, housing 14 can be maintained in the selected position for off-state usage of rearview mirror 10 (without continued output from motor 26, as described further below), meaning that upon deactivation of display substrate 52, resulting in a return of substrate 52 to the position shown in FIG. 1, rearview mirror 10 may be in a generally acceptable position for inactive state usage thereof and may remain so until motor 26 is used to move mirror 10 back to the active state position.

As described above, movement of housing 14 and substrate 52 can be achieved by the above-described operative coupling of motor 26 with socket body 34 by engagement of worm gear 36 with worm wheel 44, the further engagement of gear 40 with the teeth 42 of socket body 34, and the operative coupling of spring arms 27 with socket body 34. In this arrangement, rotation of socket body 34 moves second end 28 of mounting plate 20 in a generally outward or inward direction with respect to housing 14, thereby causing rotation of housing 14 and substrate 52 about first end 22 of mounting plate 20 upward or downward about mounting structure 58 with which mounting plate 20 is generally fixed.

Returning now to FIG. 1, housing 14 is shown in the form of a single-piece structure, which can be made to generally replicate the appearance of a standard rearview mirror, and can further be made from a single piece of injection molded plastic or the like, although other materials are possible. In an example, substrate 52 can be coupled directly to housing 14 over open end 18. In an alternative example, substrate 52 can be coupled with a bezel or other secondary housing piece (not shown) that can, in turn, be coupled with housing 14. In either example, housing 14 is structured so that interior cavity 16 is of a sufficient depth to retain internal structures thereof, including motor 26, actuation mechanism 24, and other related structures, as well as control circuitry for display substrate 52. Housing 14 is also structured such that open side 18 is sufficiently large to accept substrate 52 therein in a manner that, again, can replicate the appearance of a typical rearview mirror.

Mounting plate 20, as described above, is rotatably coupled with housing 14 at first end 22 thereof. Such coupling can be achieved by the incorporation of a first hinge portion 64 into first end 22 of mounting plate 20 and a mating second hinge portion 66 into housing 14. Alternatively, a separate hinge (not shown) can be coupled between mounting plate 20 and housing 14. As further shown in FIG. 1, mounting plate 20 can generally extend through a majority of a vertical height of housing 14 and can, further, be of a width sufficient to stably support the entirety of mirror 10, such as by attachment of mounting structure 58 to a side of mounting plate 20 opposite substrate 52.

Turning now to FIGS. 4 and 5, the movement of mounting plate 20 is achieved by actuation mechanism 24 and is illustrated in detail. In particular, the structure of socket body 34, spring plate 25 (including spring arms 27), and mounting plate 20 is such that, as discussed above, the operable coupling of spring arms 27 with socket body 34 provides two stable positions for socket body 34 that correspond to the inactive (FIG. 4) and active (FIG. 5) positions for mounting plate 20. Such positions are angularly spaced-apart from each other by angle 70 (FIG. 5), which may be between about 5° and about 10° (and in an embodiment about 6°). Further, such rotation of mounting plate 20 can be achieved through rotation of socket body 34 through an angle 72 of between about 70° and 100° and in one embodiment about 80°. As discussed previously, the coupling of spring arms 27 with socket body 34 can provide both for the desired rotation of mounting plate 20 and for the above-noted stable positions. In particular, spring arms 27 are coupled with socket body 34 by engagement thereof within slot 74 (thereby forming a coupling axis therebetween), which is configured so as to receive spring arms 27 (such as by a cradling, snap, or press-fit arrangement) and to maintain a general position thereof that is offset from an axis of rotation 76 of socket body 34 by a distance 78 (FIG. 5) of between, for example, 2 mm and 5 mm, and in an embodiment about 4 mm.

The offset arrangement of slot 74 with respect to axis 76 is such that slot 74 translates in the longitudinal-horizontal direction 80 upon rotation of socket body 34 about axis 76. This translation causes movement of spring arms 27, which are coupled therewith, resulting in rotation of mounting plate 20 about first end 22. Spring arms 27 are of a resiliently deformable material, such as metal (e.g. spring steel, aluminum, or the like), for example, which may be the same as the entirety of spring plate 25 with which spring arms 27 may be integrally joined. The resilient deformability of spring arms 27 allows them to accommodate the component movement of slot 74 in the vertical direction 82 during the rotation thereof that results in the aforementioned longitudinal horizontal translation.

Spring arms 27 can further be tuned to provide the above-noted stable positions for articulation mechanism 24 and, accordingly, rearview mirror 10. In particular, the resilient deformability of spring arms 27 may be such that spring arms 27 exert a spring force opposing the compression thereof that results from the vertical movement component of slot 74 during rotation of spring body 34 about axis 76, such spring force being sufficient to overcome the internal forces of mechanism 24 (e.g. friction between and among the various components thereof) and to urge socket body 34 into either of the positions thereof that are associated with the inactive position (as shown in FIG. 4) and the active position (as shown in FIG. 5), upon slot 74 passing a vertical-most position during rotation thereof. In other words, spring arms 27 can provide a generally vertically-downward force on slot 74 that urges rotation of socket body 34 when slot 74 is on either side of the vertical-most position during rotation thereof. Spring arms 27 can, further, be configured so as to be under compression when articulation mechanism 24 is in either stable position.

Figure 6:
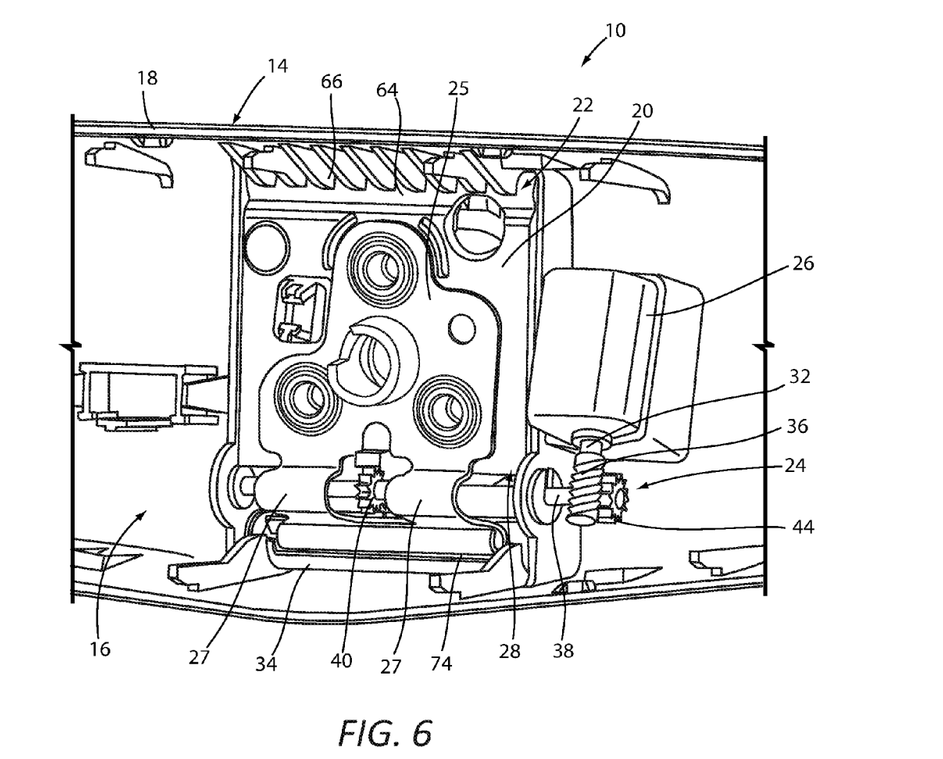
FIG. 6 is a front-perspective detail view of the rearview mirror of FIG. 1 showing the actuation mechanism.

As shown in FIG. 6, the operative coupling of motor 26 with socket body 34 by worm gear 36, worm wheel 44, and gear 40 is such that motor 26 can rotate socket body 34 so as to apply a force on spring arms 27 to cause rotation of mounting plate 20 about first end 22. In this arrangement, the engagement between worm gear 36 and worm wheel 44 provides a reduction in the output of motor 26 that influences the amount of movement of socket body 34 that is achieved by rotation of output shaft 32. This not only affects the speed of such movement but the torque applied to socket body 34 by motor 26. In various configurations, additional reduction can be provided by the engagement between gear 40 and the teeth 42 of socket body 34, as discussed further below.

In an example, articulation mechanism 24, including spring arms 27 and socket body 34, can be configured such that a torque applied to socket body 34 of at least 200 N-mm is required to overcome the force of spring arms 27 and rotate socket body 34 about axis 76. It may be desired to use a motor 26 that can produce between about 5 N-mm and 20 N-mm of torque, for example, at output shaft 32. Accordingly, the engagement between worm gear 36 and worm wheel 44, as shown in FIG. 6, may allow motor 26 to rotate output shaft 32 at a higher speed, with such speed reduced by worm gear 36 and worm wheel 44 to produce a higher torque on bearing shaft 38, which is then applied to socket body 34 by the engagement between gear 40 and teeth 42. In an example, worm gear 36 and worm wheel 44 may have a gear ratio of between about 12:1 and about 20:1, and in one embodiment, about 16:1. To achieve such a reduction, a single-start worm gear 36 can be used in connection with a 16-tooth worm wheel 44, for example, with other arrangements being possible.

Motor 26, in an actuation mechanism 24 with worm gear 36 and worm wheel 44, as described above, may rotate output shaft 32 at a speed of between about 80 and about 140 revolutions per minute, and in one example about 108 revolutions per minute to affect rotation of socket body 34 through a rotation of about 80° in two seconds or less, for example, at the appropriate torque needed to overcome the force of spring arms 27 and rotate socket body 34, thereby rotating mounting plate 20. It is noted that, although worm gear 36 and worm wheel 44 are illustrated in FIG. 6 as contacting cylinders, such depiction is meant to represent a worm gear 36 and worm wheel 44 having the threads and teeth depicted on worm gear 36 and worm wheel 44 in FIGS. 1-5.

As mentioned above, additional reduction may be provided by the gear ratio of gear 40 and the teeth 42 of socket body 34, which may be, for example between 1.2 and 1.5 (with other ranges being possible). In such instances, the reduction between worm gear 36 and worm wheel 44 can be adjusted accordingly, or the speed of rotation, as well as the total rotation, of output shaft 32 can be adjusted to achieve the desired speed and total rotation of socket body 34, with motor 26 providing torque above that which is required for movement thereof. Similarly, the ratio provided by worm gear 36 and worm wheel 44 itself can be selected to provide torque above the amount needed for movement of socket body 34, with the rotational speed and total rotation of output shaft 32 being correspondingly adjusted. Such additional torque may provide smoother movement of mirror 10.

Returning to FIG. 5, the active position of mirror 10 can correspond to a positioning of mounting plate 20 in a generally parallel relationship to front wall 85. As discussed above, during movement of rearview mirror 10 out of the active position shown in FIGS. 3 and 5 and into the inactive position shown in FIGS. 1 and 4, motor 26 is used to implement rotation socket body 34 and, further of mounting plate 20. As shown in FIGS. 4 and 5, rotation of socket body 34 through an angle 70 of about 80° can correspond to rotation of mounting plate 20 through a corresponding angle 72 of, for example, about 6° to position mirror 10 in the active position, as shown in FIG. 5. The above-described reduction provided by worm gear 36 and worm wheel 44 can be such that rotation of output shaft 32 through about 3 revolutions and about 10 revolutions (and in one embodiment about 3.6 revolutions) can cause such rotation of socket body 34.

Such rotation of output shaft 32 by motor 26 can be implemented by a controller, such as controller 92, which is depicted schematically in FIG. 2. Examples of a controller 92 can be within mirror 10 or that is included in another control system of vehicle 12, such as that which is associated with the rear vision system depicted in FIG. 2. Further, the rotation of output shaft 32 can be implemented based on a calculation of the rotation thereof using the characteristics of the motor and the current applied thereto or can be controlled based on information received from one or more sensors within motor 26 or elsewhere within mirror 10. When movement of mirror 10 from the inactive state (FIG. 4) to the active state (FIG. 5) is desired, rotation of output shaft 32 can be driven by motor 26 opposite to the direction used to move mirror 10 from the active state to the inactive state.

In an embodiment, motor 26 can be a 12 volt DC motor that can be configured to operate at 8 volts or more at 80° C. Further, motor 26 can be controlled to output shaft 32 through the above-described motion in a period of about 2 seconds or less. In an embodiment, the controller 92 (FIG. 2) for motor 26 can be configured to move mirror 10 to the inactive position, if necessary, upon a loss of power thereto, which can include an unexpected loss of power or upon the associated vehicle being turned off.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A rearview mirror for a vehicle, comprising:
  a housing defining an interior cavity and an open side;
  a substrate coupled within the open side of the housing and having a reflective surface thereon; and
  an actuation mechanism coupled within the housing and including:
    a mounting plate rotatably coupled within the cavity of the housing at a first end thereof;
    a spring plate coupled with the mounting plate and having a resiliently deformable spring arm extending away from a second end of the mounting plate opposite the first end;

a socket body rotatably coupled within the interior cavity of the housing about a socket axis parallel to the second end of the mounting plate, the spring arm of the spring plate being operably coupled with the socket body at a coupling axis therebetween and parallel to the socket axis, the coupling of the spring plate with the socket body directly linking rotation of the socket body about the socket axis with relative movement of the housing with respect to the second end of the mounting plate; and a motor coupled within the interior cavity of the housing and operably coupled with the socket body to drive rotation thereof by a reduction mechanism including a worm gear.

2. The rearview mirror of claim 1, wherein:
the socket body defines a plurality of teeth around a portion of a circumference thereof; and
the reduction mechanism further includes a bearing shaft rotatably coupled within the interior cavity of the housing and extending generally parallel to the socket body, the bearing shaft having rigidly coupled therewith a gear operably engaged with the teeth of the socket body.

3. The rearview mirror of claim 2, wherein the worm gear is coupled with an output shaft of the motor and is in a mesh engagement with a worm wheel coupled with the bearing shaft.

4. The rearview mirror of claim 1, wherein the reduction mechanism has a reduction ratio from the motor to the socket body of between 12:1 and 20:1.

5. The rearview mirror of claim 1, wherein rotation of the socket body through a first angle causes rotation of the mounting plate about the first end between first and second stable positions.

6. The rearview mirror of claim 5, wherein:
the first angle is between about 70 degrees and 100 degrees; and
the stable positions are rotationally spaced about the first end of the mounting plate at an angle of between about 5 degrees and 10 degrees.

7. The rearview mirror of claim 5, wherein:
the rotation of the socket body through the first angle moves the coupling axis from a first position at a first distance from the first end of the mounting plate to a second position at a second distance from the first end of the mounting plate and through an apex position at a third distance from the first end of the mounting plate that is less than the first and second distances; and
the spring arms are biased against the socket body to urge the coupling axis away from the apex and toward a nearest of the first and second positions, the first and second positions corresponding to the first and second stable positions.

8. The rearview mirror of claim 1, further including a mounting arm coupled with the mounting plate, wherein:
rotation of the output shaft of the motor drives rotation of the mounting plate with respect to the housing, thereby causing the housing to rotate with respect to the mounting arm.

9. The rearview mirror of claim 1, wherein the substrate includes a display, and wherein the reflective surface overlies the display.

10. A rear-vision system for a vehicle, comprising:
a video camera mounted on the vehicle in a position to capture an image of a portion of an exterior thereof; and
a display mirror, including:
a housing defining an interior cavity and an open side;
a substrate coupled over the open side of the housing and having a display in electronic communication with the camera for presenting the image thereon and a one-way reflective layer overlying the display; and
an actuation mechanism coupled within the housing and including:
a mounting plate rotatably coupled within the cavity of the housing at a first end thereof;
a spring plate coupled with the mounting plate and having a resiliently deformable spring arm extending away from a second end of the mounting plate opposite the first end;
a socket body rotatably coupled within the interior cavity of the housing about a socket axis parallel to the second end of the mounting plate, the spring arm of the spring plate being operably coupled with the socket body at a coupling axis therebetween and parallel to the socket axis, the coupling of the spring plate with the socket body directly linking rotation of the socket body about the socket axis with relative movement of the housing with respect to the second end of the mounting plate; and
a motor coupled within the interior cavity of the housing and operably coupled with the socket body to drive rotation thereof by a reduction mechanism including a worm gear.

11. The system of claim 10, further comprising control circuitry coupled with the motor for controlling the motor in driving the rotation of the socket body, wherein:
the control circuitry is further in electronic communication with the display and automatically causes the rotation of the socket body to move the housing between first and second positions upon one of an activation or deactivation of the display, respectively.

12. The system of claim 11, wherein when in the first position, the substrate is angled toward a headliner of the vehicle by between 5 degrees and 10 degrees relative to the second position.

13. The system of claim 12, wherein the first and second positions of the housing correspond with first and second stable positions of the actuation mechanism.

14. The system of claim 10, wherein:
the socket body defines a plurality of teeth around a portion of a circumference thereof; and
the reduction mechanism further includes a bearing shaft rotatably coupled within the interior cavity of the housing and extending generally parallel to the socket body, the bearing shaft having rigidly coupled therewith a gear operably engaged with the teeth of the socket body.

15. The system of claim 14, wherein the worm gear is coupled with an output shaft of the motor and is in a mesh engagement with a worm wheel coupled with the bearing shaft.

16. A vehicle, comprising:
a windshield;
a headliner adjacent an upper edge of the windshield; and
a mirror assembly mounted within the vehicle adjacent the windshield and the headliner and including:
a substrate including a display and a one-way reflective layer overlying the display;
a mounting plate rotatably coupled within the cavity of the housing at a first end thereof;

a spring plate coupled with the mounting plate and having a resiliently deformable spring arm extending away from a second end of the mounting plate opposite the first end;

a socket body rotatably coupled within the interior cavity of the housing about a socket axis parallel to the second end of the mounting plate, the spring arm of the spring plate being operably coupled with the socket body at a coupling axis therebetween and parallel to the socket axis, the coupling of the spring plate with the socket body directly linking rotation of the socket body about the socket axis with relative movement of the housing with respect to the second end of the mounting plate; and a motor coupled within the interior cavity of the housing and operably coupled with the socket body to drive rotation thereof by a reduction mechanism including a worm gear.

17. The vehicle of claim 16, wherein rotation of the socket body through a first angle causes rotation of the mounting plate about the first end between first and second stable positions.

18. The vehicle of claim 17, wherein when in the first stable position, the substrate is angled toward the headliner by between 5 degrees and 10 degrees relative to the second stable position.

19. The vehicle of claim 17, further comprising a control circuitry coupled with the motor for controlling the motor in driving the rotation of the socket body, the control circuitry further being in electronic communication with the display and automatically causing the rotation of the socket body to move the mounting plate between the first and second stable positions upon one of an activation or deactivation of the display, respectively.

20. The vehicle of claim 16, wherein:

the socket body defines a plurality of teeth around a portion of a circumference thereof; and the reduction mechanism further includes a bearing shaft rotatably coupled within the interior cavity of the housing and extending generally parallel to the socket body, the bearing shaft having rigidly coupled therewith a gear operably engaged with the teeth of the socket body.

* * * * *